(12) United States Patent
Keefer et al.

(10) Patent No.: US 7,017,599 B2
(45) Date of Patent: Mar. 28, 2006

(54) THERMAL RELIEF VENT AND METHOD OF MANUFACTURING THE SAME

(76) Inventors: Neal L. Keefer, 4025 NE. Couch St., Portland, OR (US) 97232; Kenneth A. Watson, 1100 NE. 126th St., Vancouver, WA (US) 98685; John A. Loffink, 17666 SE. Vogel Rd., Boring, OR (US) 97009

( * ) Notice: Subject to any disclaimer, the term of this patent is extended or adjusted under 35 U.S.C. 154(b) by 55 days.

(21) Appl. No.: 10/369,255

(22) Filed: Feb. 18, 2003

(65) Prior Publication Data
US 2004/0159349 A1    Aug. 19, 2004

(51) Int. Cl.
*F16K 17/38*    (2006.01)

(52) U.S. Cl. .......................... 137/72; 137/39; 137/73; 137/80; 137/202

(58) Field of Classification Search .......... 137/15.18, 137/72, 73, 79, 80, 39, 202; 220/89.4, 359.1, 220/360, 362, DIG. 33, 202, 201
See application file for complete search history.

(56) References Cited

U.S. PATENT DOCUMENTS

| | | | |
|---|---|---|---|
| 2,489,787 A * | 11/1949 | Knowlton | 220/203.08 |
| 2,990,842 A | 7/1961 | Good | |
| 3,970,098 A * | 7/1976 | Boswank et al. | 137/39 |
| 4,059,125 A * | 11/1977 | Sugimura et al. | 137/73 |
| 4,139,005 A * | 2/1979 | Dickey | 138/89 |
| 4,325,398 A * | 4/1982 | Green | 137/39 |
| 4,457,325 A * | 7/1984 | Green | 137/39 |
| 4,487,215 A * | 12/1984 | Green | 137/43 |
| 4,796,777 A * | 1/1989 | Keller | 220/203.2 |
| 4,886,089 A | 12/1989 | Gabrlik | |
| 5,107,900 A * | 4/1992 | Sugimura | 138/30 |
| 5,111,837 A | 5/1992 | Morris | |
| 5,325,882 A | 7/1994 | Forsythe | |
| 5,405,040 A * | 4/1995 | Keller | 220/304 |
| 5,762,091 A * | 6/1998 | Sarne et al. | 137/74 |
| 5,791,367 A * | 8/1998 | Hackman et al. | 137/74 |
| 6,145,530 A * | 11/2000 | Fernandez | 137/74 |

* cited by examiner

*Primary Examiner*—Ramesh Krishnamurthy
(74) *Attorney, Agent, or Firm*—Ingrid McTaggart

(57) ABSTRACT

An improved thermal relief vent for a fuel tank, and a method of manufacturing the same, includes a thermal relief ring that is used to create a mechanical seal within the vent. The thermal relief ring, at room temperature, is crimped in place by use of the vent cap itself. The crimped thermal relief ring creates a mechanical seal between the vent and the vent cap, up until a predetermined thermal relief point, at which time the thermal relief ring will soften and/or yield and release the vent cap from the vent body.

1 Claim, 2 Drawing Sheets

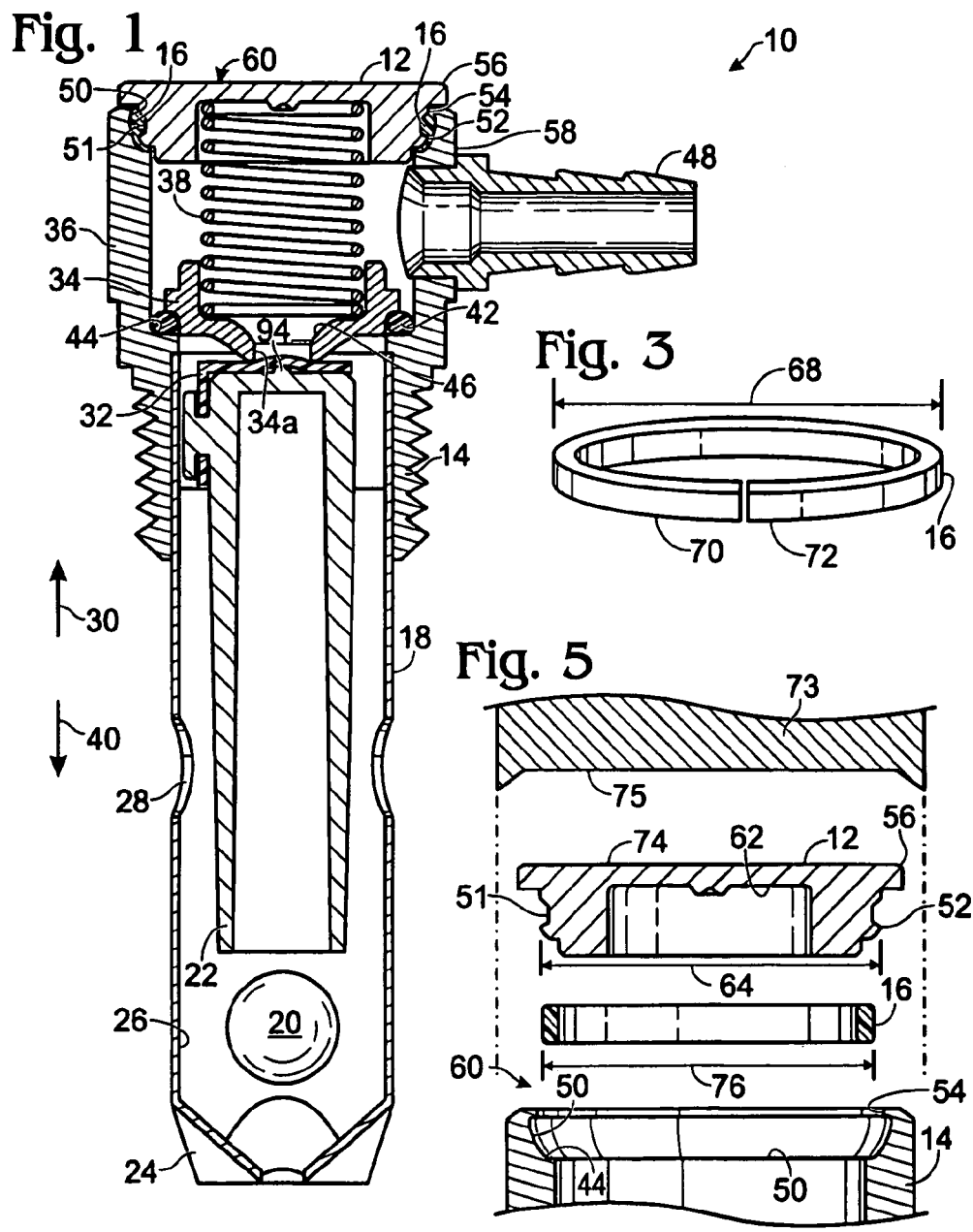
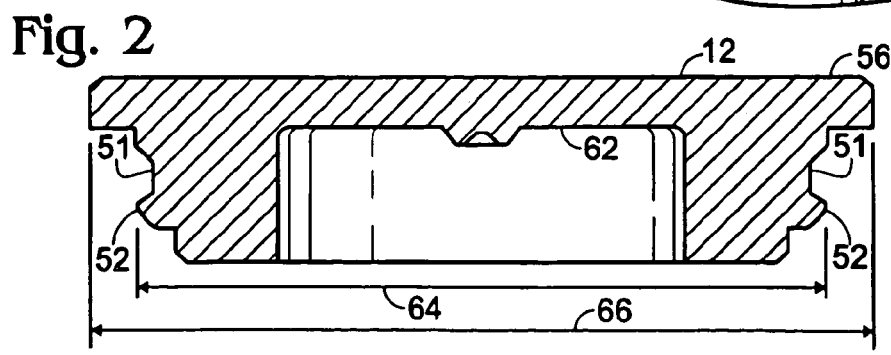

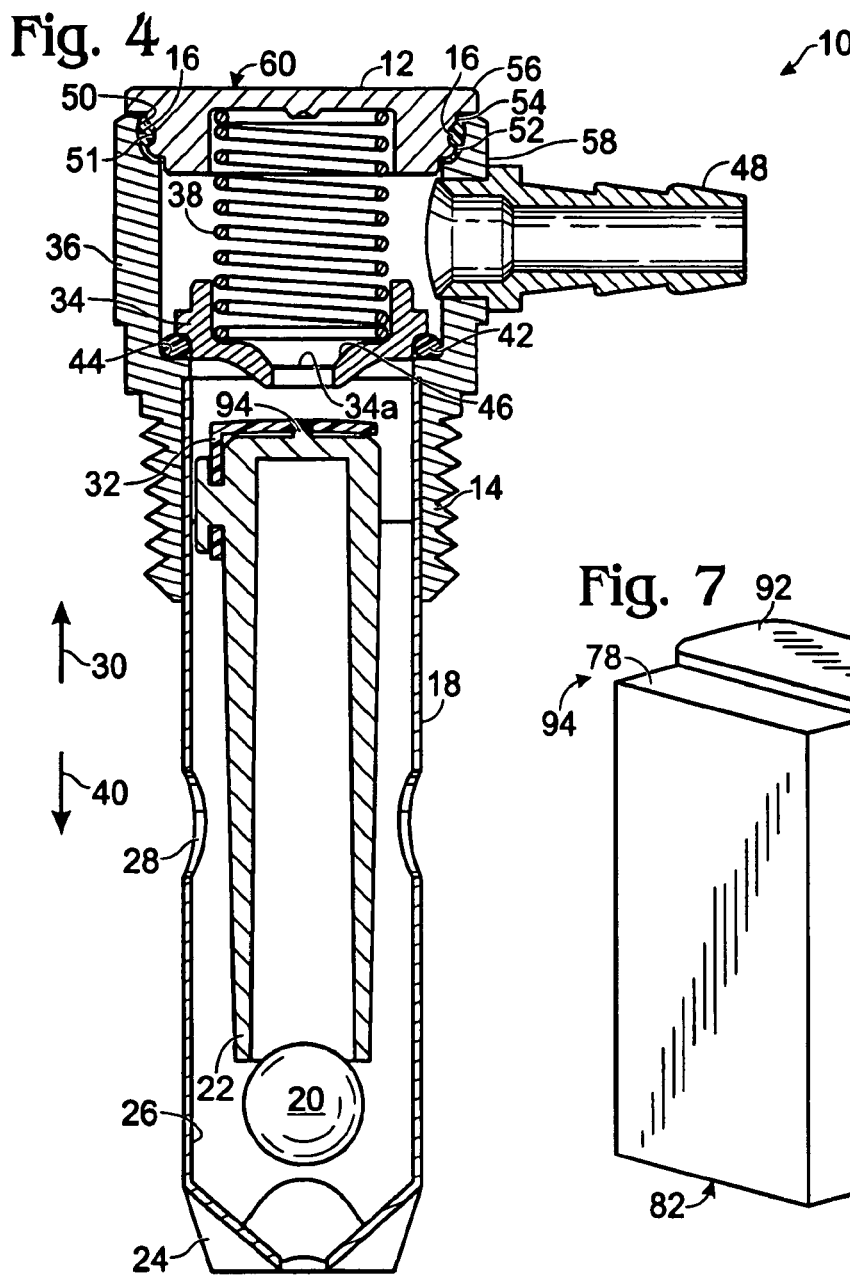
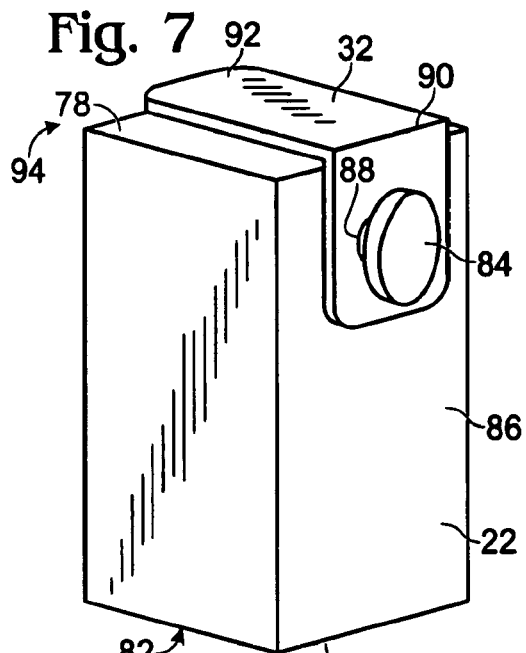
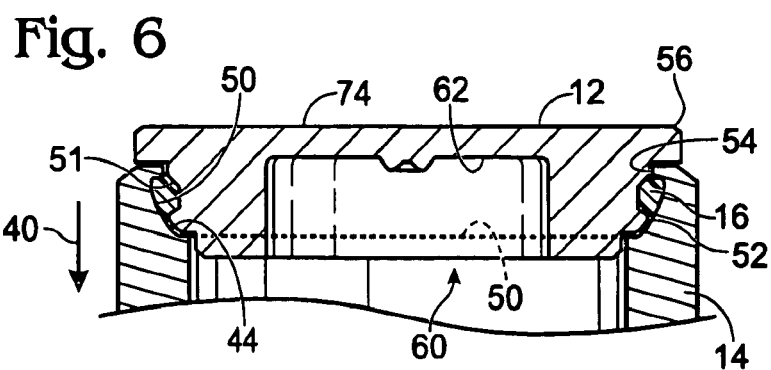

THERMAL RELIEF VENT AND METHOD OF MANUFACTURING THE SAME

TECHNICAL FIELD

The present invention relates to an improved thermal relief vent for a fuel tank wherein a thermal relief ring creates a mechanical seal within the vent and, more particularly, to an improved thermal relief vent wherein a thermal relief ring is crimped in place by the vent cap. The crimped thermal relief ring creates a mechanical seal between the vent and the vent cap, up until a predetermined thermal relief point, at which time the thermal relief ring will soften and/or melt and release the vent cap from the remainder of the vent.

BACKGROUND OF THE INVENTION

Fuel tanks, such as those used on commerical vehicles, are subject to a number of safety requirements. One of these safety requirements is the inclusion of a thermal relief system that allows venting of pressure within the fuel tank when the tank reaches a predetermined temperature. One type of thermal relief system is disclosed in U.S. Pat. No. 5,111,837 to Morris, which discloses a termal relief valve including a ring of fusible material that is cast in situ within a chamber positioned between an abutment member and a plate. At elevated temperatures the fusible material melts to allow the plate and the abutment member to slide relative to each other such that the plate may move outwardly from the vent, thereby releasing pressure within the fuel tank.

There are several disadvantages with such an in situ casting method. In particular, molten fusible material, such as molten metal, is required which requires subjecting workers to the hazards of handling high temperature molten metals. There are costs in generating and maintaining the molten material, as well as the safety equipment that must be purchased to work with such molten material. Additionally, employers generally must monitor the level of toxic metals in employee's bodies to ensure the safety of the process.

The in situ casting method, which involves injecting molten metal into a cavity, could result in air bubbles or an otherwise imperfect fill of the cavity, rendering the cast ineffective. Moreover, an imperfectly filled cavity may not be readily visible or otherwise detectible, such that a defective thermal relief vent may be sold to end consumers and installed on a vehicle. Additionally, the releasable vent plate generally must be held in position before, during and for a short time period after the molten material is poured, so that the molten material will solidify with the plate correctly positioned. The logistics of holding the plate in place before, during and shortly after the molten material is poured adds complexity to the in situ casting process.

SUMMARY OF THE INVENTION

The present invention provides an improved thermal relief vent for a fuel tank, and a method of manufacturing the same, wherein a thermal relief ring is used to create a mechanical seal within the vent. More particularly, the improved thermal relief vent includes a thermal relief ring that, at room temperature, is crimped in place by the vent cap itself. The crimped thermal relief ring creates a mechanical seal between the vent and the vent cap, up until a predetermined thermal relief point, at which time the thermal relief ring will soften and/or melt and release the vent cap from the remainer of the vent.

The manufacturing process of crimping a solid ring of fusible material in place with use of the vent cap itself alleviates many disadvantages of the prior art. Namely, use of a room temperature ring of fusible material eliminates many hazards and expenses associated with the use of molten metal. Additionally, use of a ring of fusible material eliminates the problems associated with casting such as air bubbles and partially filled casting chambers. Moreover, crimping of the fusible ring by use of the vent cap itself eliminates the need for holding the cap in place during casting.

In a preferred embodiment the method comprises providing a ring of fusible material, such as lead, and crimping the lead ring in place between the body of the vent and a vent cap by applying pressure to the vent cap when seated on the vent body. Crimping of the ring of fusible material causes the ring to "flow" into and around one or more annular grooves positioned on an inside surface of the vent body and on an exterior surface of the vent cap, to create a mechanical seal between the body and the cap.

Accordingly, an object of the present invention is to provide a thermal relief vent that provides an airtight seal on a fuel tank during normal thermal conditions.

Another object of the present invention is to provide a thermal relief vent that releases pressure within a fuel tank upon the tank reaching a predetermined temperature.

Still another object of the present invention is to provide a thermal relief vent that is installed without the use of molten fusible material.

Yet another object of the present invention is to provide a thermal relief vent that is manufactured by a mechanical crimping operation.

BRIEF DESCRIPTION OF THE DRAWINGS

FIG. 1 is a cross-sectional view of the thermal relief vent with the vent cap and ring of fusible material crimped therein, with the vent shown in a pressurized configuration;

FIG. 2 is a cross-sectional view of one embodiment of the vent cap;

FIG. 3 is an isometric view of the ring of fusible material;

FIG. 4 is a cross-sectional view of the thermal relief vent with the vent cap and ring of fusible material crimped therein, with the vent shown in a non-pressurized configuration;

FIG. 5 is a detailed cross-sectional view of one embodiment of the cap and ring of fusible material prior to crimping thereof;

FIG. 6 is a detailed cross-sectional view of the cap and ring of fusible material after crimping thereof; and FIG. 7 is an isometric view of the float and the float seal of the thermal relief vent.

DETAILED DESCRIPTION OF THE PREFERRED EMBODIMENT

Referring to the figures, FIG. 1 shows a cross-sectional view of the thermal relief vent 10 with the vent cap 12 positioned on the vent body 14, and a ring of fusible material 16 crimped therein, with the vent shown in a pressurized configuration. In the embodiment shown, vent body 14 comprises an elongate float section 18, also referred to as a cage tube section 18, which houses a ball 20 and a float 22. Cage body 18 includes a crimped end portion 24 which prevents the exit of ball 20 and float 22 from an interior 26 of cage body 18. The crimped end portion 24 and apertures 28 allow fuel and pressure within the fuel tank to communicate with interior 26 of cage body 18. In a pressurized configuration, i.e, when the interior of the fuel tank and therefore the interior 26 of the cage body 18 is subject to a pressure above a first predetermined value, or in the condition of partial tank rollover, the fuel level will cause float 22 to move in a direction 30 within vent body 14 such that a seal 32 positioned on float 22 will contact a vent valve 34, having a lower opening 34a, positioned within a neck portion 36 of vent body 14. A spring 38 is positioned within neck portion 36 of the vent body 14, and, up until a second predetermined pressure is exerted against the spring in direction 30, the spring 38 exerts a pressure on vent valve 34 in a direction 40, forcing an O-ring 42 of the vent valve 34 against a seat 44, or shoulder 44, of neck portion 36 of vent body 14. Once the pressure within the tank exceeds the second predetermined pressure, float 22 moves further in direction 30, thereby forcing vent valve 34 further in direction 30, thereby slightly compressing spring 38 in direction 30. This movement of vent valve 34 in direction 30, so that O-ring 42 is no longer in contact with shoulder 44, allows fuel or pressurized gas within the fuel tank and vent to escape from the vent 14 through an aperture 46 of neck portion 36 and out of the vent body 14 through a hose barb 48.

Still referring to FIG. 1, spring 38 is retained within neck portion 36 of the vent body 14 by vent cap 12 and ring of fusible material 16. In particular, during assembly of thermal relief vent 10, ring of fusible material 16 (shown more clearly in FIG. 3) is positioned in an annular recess 50 of vent neck portion 36. Vent cap 12 is then crimped on the vent body 14, i.e., vent cap 12 is forced in direction 40 against ring of fuisible material 16. Ring 16 typically is manufactured of a thermal relief material, i.e, a material that will soften or otherwise yield upon reaching a predetermined temperature. In a preferred embodiment, ring 16 is manufactured of an alloy of lead, but other thermal relief materials may be utilized for particular applications. As vent cap 12 is forced or crimped in direction 30, fusible ring 16 "flows around" one or more threads 52 on vent cap 12, one or more threads 54 in annular recess 50 of vent neck portion 36, and throughout annular recess 50 of neck portion 36 and throughout recess 51 of vent cap 12. Vent cap 12 is crimped on vent body 14 until a shoulder 56 of the vent cap 12 abutts the top portion 58 of vent body 14. With the cap 12 in this crimped position on body 14, the ring of fusible material 16 has "flowed" around threads 52 and 54, and typically has filled annular recesses 50 and 51 such that ring 16 creates a mechanical and an airtight seal between vent cap 12 and vent body 14. Accordingly, in the method of manufacturing the thermal relief vent 10 of the present invention, vent cap 12 itself is used as the force mechanism to seat ring 16.

Use of cap 12 itself to apply a force to ring 16 eliminates the positioning problems posed by the prior art wherein the cap must be held in place while molten metal is injected around the cap. Moreover, the crimping method of the present invention eliminates the need for the use of molten metal, thereby eliminating the hazards and costs associated with molten metal casting operations. Additionally, the ring 16 of fusible material utilized in the present invention typically has a circumference that matches the circumference of annualar recess 50 of neck portion 36 such that the mechanical seal of fusible material positioned between vent cap 12 and vent body 14 fills the entirety of annular recesses 50 and 51 and does not include air pockets, as do some cast seals of the prior art.

As stated above, ring 16 typically is manufactured of a thermal relief material, i.e, a material such as a lead alloy that will soften or otherwise yield upon reaching a predetermined temperature. For example, when thermal relief vent 10, or the contents within a fuel tank on which the vent is mounted, reaches a predetermined temperature, the fusible material will also be subjected to the predetermined temperature. Upon reaching this predetermined temperature, fusible material 16 will soften or yield, thereby allowing cap 12 to become loosened with respect to vent body 14. Upon softening of fusible material 16, the mechanical seal created by the fusible material is weakened such that spring 38, or pressure within interior 26 of vent body 14, will force vent cap 12 from vent body 14 in direction 30. Once vent cap 12 is forced from vent body 14, pressure within interior 26 of the vent body is vented out an opening 60 of vent body 14.

Each of the components of vent 10 typically are manufactured of a material that will withstand the high temperatures and pressures, and the harsh environmental conditions associated with the commercial trucking industry. In one embodiment, cap 12, body 14 and hose barb 48 are manufactured of brass. Float ball 20 and spring 38 may be manufactured steel. Float 22 typically is manufactured of plastic or another like bouyant material. Seal 32 and O-ring 42 typically are manufactured of a flexible material, such as rubber, plastic or the like.

FIG. 2 shows a cross-sectional view of vent cap 12 including shoulder 56, external threads 52, annular recess or groove 51, and an interior recess 62 for receiving spring 38. Annular groove 51 defines a diameter 64 and shoulder 56 defines a slightly larger diameter 66.

FIG. 3 shows an isometric view of the ring of fusible material 16. Ring 16 typically has a diameter 68 approximately the same size as diameter 64 of cap 12, and smaller than diameter 66 of cap 12. Ring 16 may be manufactured by taking an elongate piece of fusible material, cutting it to a preferred length, and then bending it into a circular shape as shown in FIG. 3 such that ends 70 and 72 abutt one another. In another embodiment, ring 16 may be manufactured by taking an elongate piece of fusbile material, cutting it in a preferred length, and then bending it into a circular shape such that ends 70 and 72 overlap one another. In yet another embodiment, ring 16 may be stamped, such as in the circular shape as shown, from a sheet of fusible material. In still another embodiment, ring 16 may be cast from molten material. Applicants note that such a casting method may be conducted for the fabrication of ring 16, prior to placement of the solid, previously formed ring 16 within body 14. In a preferred embodiment, a lead "wire" is wound into a helix on a mandrel. The helix is then cut along the length of the mandrel to form many lead rings with a single cut.

FIG. 4 shows a cross-sectional view of the thermal relief vent 10 in a nonpressurized configuration. In particular, float 22 is shown in a lowered position such that seal 32 on the float is not in contact with vent valve 34.

FIG. 5 shows a detailed cross-sectional view of the cap 12, body 14 and ring 16 of fusible material prior to crimping thereof. Prior to crimping of cap 12 to vent body 14, cap 12 is positioned above opening 60 of the vent body. Cap 12 may be held in such a position, for example, manually by a assembly device 73 that has a recess 75 into which the top portion 74 of cap 12 seats. Recess 75 generally is similar in shape to cap 12 such that device 73 is self aligning. Cap 12 is held in this seated and centered posiiont by the force of spring 38 (not shown in this figure). Ring 16 is positioned on shoulder 44, within annular recess 50 and adjacent threads 54 of of vent body 14. A diameter 76 of threads 54 and recess 50 of vent body 14 typically is slightly larger than diameter 64 of threads 52 and recess 51 of cap 12 such that the threads 52 and 54 do not mate with one another but are positioned adjacent one another. In this manner, fusible material 16 may "flow" around threads 52 and 54, and through recesses 50 and 51 so as to secure cap 12 on vent body 14. In another embodiment, threads 52 and 54 may mate with another another (such that diameters 64 and 76 are approximately the same size), thereby requiring cap 12 to be twisted or turned with respect to body 14, in order for cap 12 to be received within annular recess 50 of vent body 14. In this embodiment wherein the threads mate with one another, a sufficient amount of space will still remain between the mating threads so that ring 16 will "flow" around threads 52 and 54 during crimping of cap 12 to body 14.

FIG. 6 shows a detailed cross-sectional view of cap 12, body 14 and ring 16 of fusible material after crimping thereof wherein assembly fixture 73 has been removed. In particular, to secure cap 12 to body 14, cap 12 is moved in direction 40 toward body 14 by assembly 73 with a force great enough to cause fusible material 16 to flow, i.e., to deform, such that fusible material 16 conforms to the shape of annular recesses 50 and 51, and threads 52 and 54. Of course, body 14 can be moved toward cap 12 or both the body and cap may be moved toward each other. The force exerted against cap 12 and body 14 should preferably be sufficient to cause deformation of ring 16 but less than the force required to deform cap 12 and body 14. The amount of force required for any particular application will depend on, for example, the size and shape of threads 52 and 54, the size of annular recesses 50 and 51, the type of fusible material used to manufacture ring 16, the size of ring 16, and the depth of threads 52 and 54. As shown in FIG. 6, ring 16 forms a mechanical and an airtight seal between cap 12 and body 14 such that cap 12 will not become displaced with respect to body 14 until ring 16 is softened thereby allowing cap 12 to be removed therefrom.

FIG. 7 shows an isometric view of the float 22 and the float seal 32 of the thermal relief vent 10. In the embodiment shown, float 22 comprises an elongate float having a generally square cross sectional shape wherein top surface 78 is solid and a lower surface 80 allows access to a hollow interior 82 of the float. A tab 84 extends outwardly from a side surface 86 of the float and engages an aperture 88 of seal 32. Seal 32, in the embodiment shown, is manufactured with a bend 90 in a midsection thereof, such that an end region 92 of the seal is positioned overlying top surface 78 of float 22. Due to bend 90 of the seal, and due to the flexible and resilient nature of the material from which seal 32 is manufactured, end region 92 of the seal is flexibly positioned on top surface 78 of the float. As shown more clearly in FIG. 1, top surface 78 of float 22 may include an upwardly extending projection 94 sized to be received within opening 34*a* of vent valve 34. Accordingly, in the pressurized condition shown in FIG. 1, projection 94 is aligned with opening 34*a* such that seal 32 contacts the lip of opening 34*a* around a circumference thereof. Moreover, due to bend 90 of the seal 32 on float 22, the seal is loosely positioned above top surface 78 of the float such that the seal will be correctly positioned for contact with opening 34*a* of the vent valve. Because seal 32 is secured to side surface 86, tab 84 is positioned away from top sealing surface 78 of the float and, therefore, will not interfere with sealing of the vent.

In the above description numerous details have been set forth in order to provide a more through understanding of the present invention. It will be obvious, however, to one skilled in the art that the present invention may be practiced using other equivalent designs.

We claim:

1. A thermal relief vent comprising:
 a rigid vent body;
 a vent cap secured to said rigid vent body; and
 a ring of thermal relief material that defines a mechanical seal between said rigid vent body and said vent cap, wherein said ring is manufactured prior to placement in said vent as a solid ring of thermal relief material;
 the vent further comprising a spring, a vent valve and a float positioned within said vent body;
 wherein said float includes a top surface positioned adjacent said vent valve and a side surface having a protrusion extending therefrom, said float including a seal secured to said protrusion and extending over said top surface of the float.

\* \* \* \* \*